Figure 1:
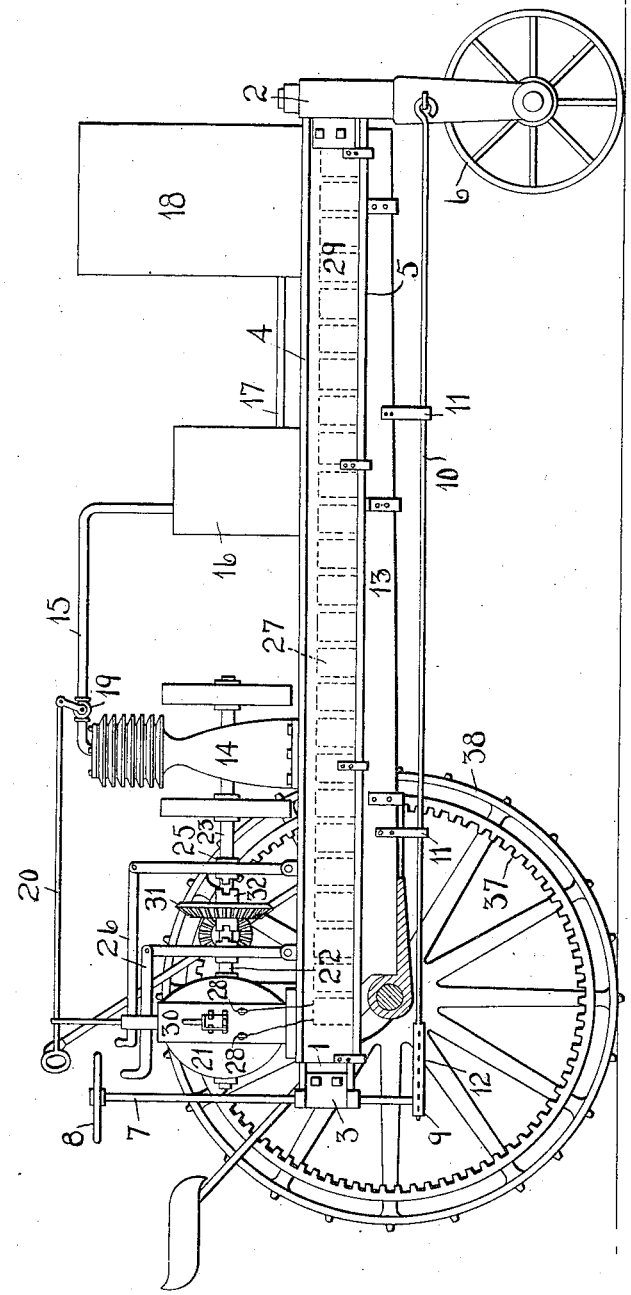

No. 870,472. PATENTED NOV. 5, 1907.
G. G. SCHROEDER.
TRACTION ATTACHMENT FOR MOVING OBJECTS.
APPLICATION FILED APR. 23, 1907.

4 SHEETS—SHEET 1.

Witnesses
L. B. James
F. Liebschutz

Inventor
G. G. Schroeder
By Wm. D. Hodges
Attorney

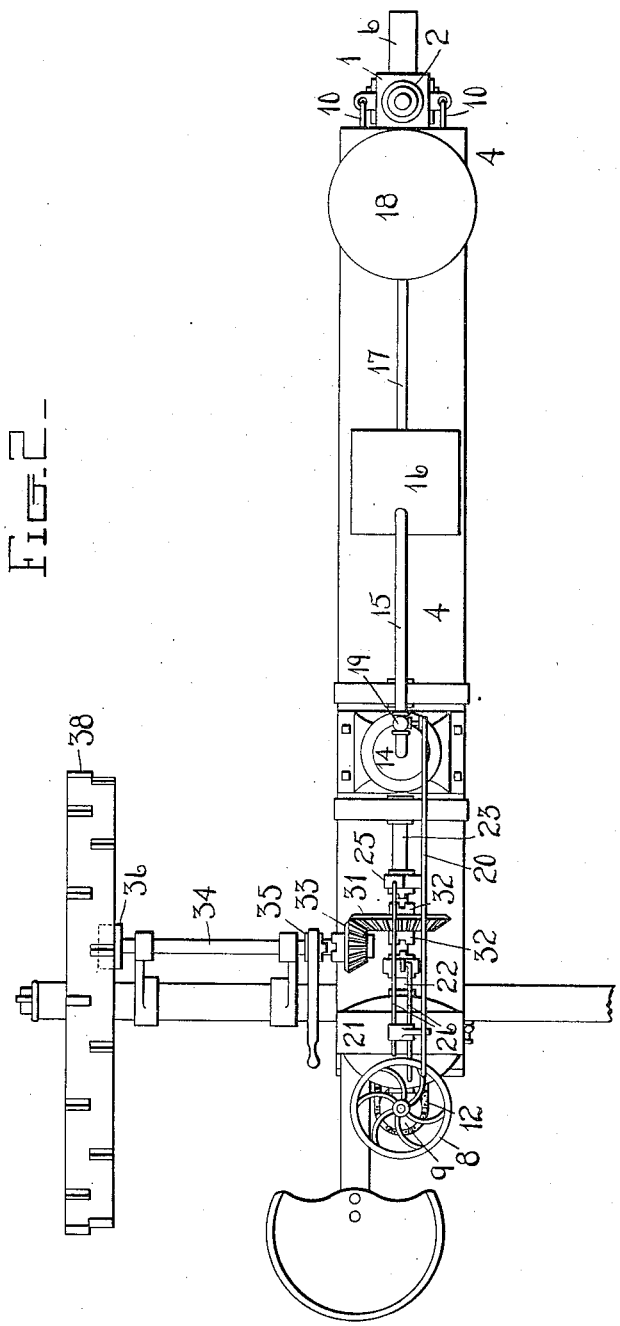

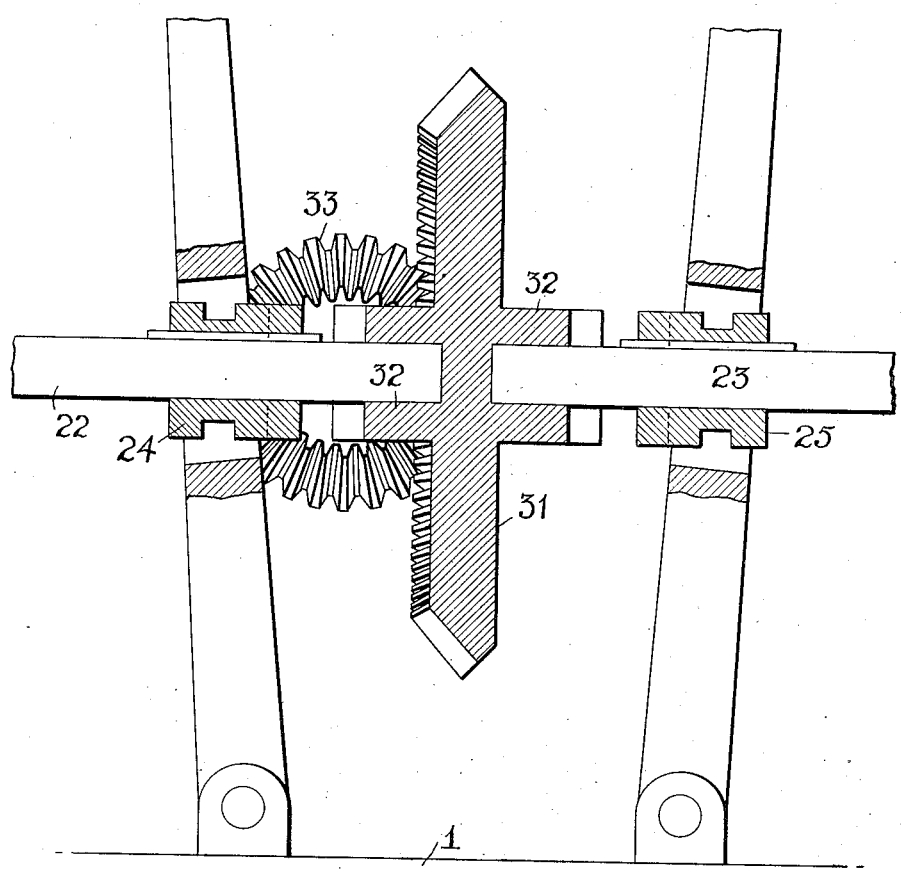

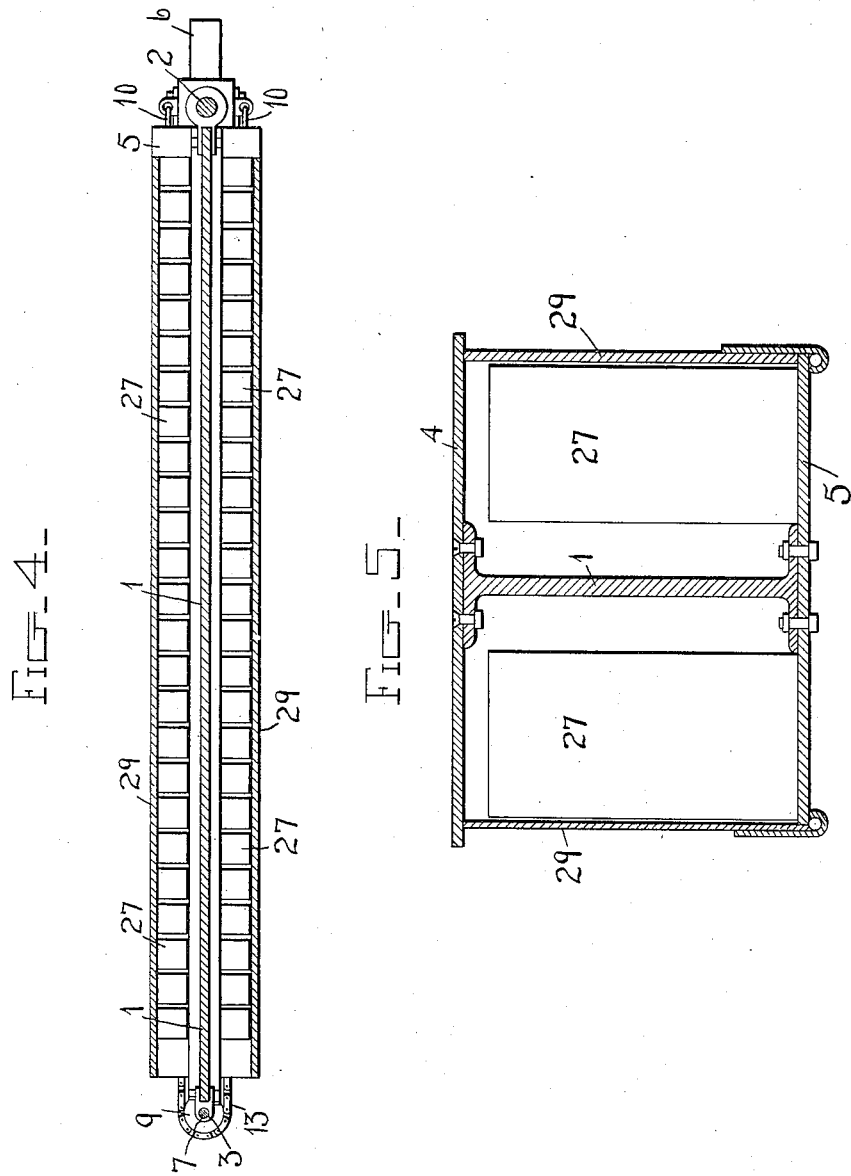

UNITED STATES PATENT OFFICE.

GEORGE G. SCHROEDER, OF WASHINGTON, DISTRICT OF COLUMBIA, ASSIGNOR TO FARM MOTOR COMPANY, A CORPORATION OF SOUTH DAKOTA.

TRACTION ATTACHMENT FOR MOVING OBJECTS.

No. 870,472.   Specification of Letters Patent.   Patented Nov. 5, 1907.

Application filed April 23, 1907. Serial No. 369,811.

*To all whom it may concern:*

Be it known that I, GEORGE G. SCHROEDER, a citizen of the United States, residing at Washington, in the District of Columbia, have invented certain new and useful Improvements in Traction Attachments for Moving Objects, of which the following is a specification.

This invention has relation to traction attachments for moving objects, and it consists in the novel construction and arrangement of its parts as hereinafter described.

The attachment is adapted to be used in connection with agricultural implements and machines, carriages, and wagons and the like, and is provided with suitable prime movers which are adapted to transmit motion to the object to which it is attached, whereby the said object and attachment is propelled. The attachment is provided with a suitable steering device which is adapted to be operated by an occupant of the moving object.

The prime movers consists of an engine (preferably of the hydrocarbon type) and suitable attachments, together with a combined electric motor and dynamo. The shafts of these two prime movers are in alinement with each other, and a suitable connection is made between the two shafts whereby one mover may operate the other and vice versa, or they may both operate in unison, and a means is provided for transmitting motion from one or the other, or both, of the prime movers to the moving object.

The prime movers are mounted upon an I, beam which is adapted to be bolted or otherwise secured to the tongue of the moving object. Said I-beam being provided with suitable storage batteries which are electrically connected with the combined motor and dynamo, and are adapted to be charged when the said device (motor and dynamo) is used as a dynamo, and are adapted to supply the electric current when the said device is used as a motor.

The advantages of this attachment are that the engine may be used as a prime mover for the moving object, or the motor and dynamo may be used as a prime mover therefor, or both prime movers may be so used. The engine may be used to operate the other prime movers as a dynamo and thereby store up current, which in turn may be used by the said prime mover when operating as a motor to operate the engine in starting and at other times or the moving object.

Suitable levers and switches are provided whereby the various elements and mechanical parts located upon the attachment may be manipulated by the occupant of the moving object.

The attachment may be readily attached to or detached from the moving object without materially altering or changing the construction or arrangement of the parts thereof.

In the accompanying drawings:—Figure 1, is a side elevation of the attachment coupled to the axle of a mover. Fig. 2, is a top plan view of the same. Fig. 3, is a transverse sectional view of the coupling between the ends of the shafts of the two prime movers of the attachment. Fig. 4, is a longitudinal sectional view of the I-beam and its attachments; and Fig. 5, is a transverse sectional view of the I-beam.

The attachment consists of the I-beam 1, to the front end of which is fixed the bearing 2, and to the rear end is fixed the bearing 3. The plate 4, is fixed to the upper edge of the said beam and the plate 5, to the lower edge. The stem of the caster 6, is journaled in the bearing 2, said caster 6, being adapted to support the forward end of the said beam 1. The steering shaft 7, is journaled in the bearing 3, and is provided at its upper end with the steering wheel 8, and at its lower end with the sprocket wheel 9. The steering rods 10, are attached at their forward ends one on each side of the stem of the caster 6; said rods pass through the guides 11, and their rear ends are connected by the sprocket chain 12, which passes around the sprocket wheel 9, and engages the teeth thereof. It will thus be seen that the steering device of the attachment may be operated by the occupant of the machine or vehicle being drawn, and that the steering movement is applied to the front or supporting wheel 6, of the attachment. The I-beam 1, is bolted or otherwise secured to the tongue 13, of the moving object. Said beam resting upon the upper surface of said tongue.

The gas engine 14, is located upon the beam 1, and constitutes a prime mover. Said engine preferably being of the air cooled type as shown in Fig. 1. The pipe 15, connects the said engine with the carbureter 16, which is also supported by the beam 1, and the pipe 17 connects the said carbureter with the tank 18, also supported by the beam 1. The said engine, carbureter and tank may be of any construction or pattern such as are now in general use. The pipe 15, is provided with a valve 19, to the stem of which is attached a rod 20, which extends back within the reach of the occupant of the moving object. Thus the said occupant may open or shut the said valve and supply or cut off the fuel gas to the engine 14. The combined motor and dynamo 21, is also supported by the beam 1, and constitutes (when used as a motor) a second prime mover. The shaft 22, of the motor and dynamo 21, is in alinement with the shaft 23, of the engine 14. The said shaft 22, being provided with a lever operated clutch 24, and the shaft 23, with a lever operated clutch 25. The lower ends of the said levers being fulcrumed to lugs carried by the beam 1, and the upper ends of said levers each being provided with a rod 26, which extend back within reach of the occupant of the moving object.

The space on each side of the I-beam 1, and the upper and lower plates 4, and 5, constitute compartments for the reception of the storage batteries or cells 27, which are electrically connected by means of the wire 28, with the motor or dynamo 21. The doors 29, are hinged to the outer edges of the lower plate 5, and are adapted to be swung up in the positions as shown in Fig. 5, and thus inclose and protect the batteries 27. The said doors may be readily opened when it is desired to adjust or replace the said batteries. The motor and dynamo 21, is provided with a switch 30, which when brought into contact with the terminals of the wires 28, 28, complete the electric circuit between the batteries 27, and the said motor or dynamo 21.

As above stated the shafts are alined. Their ends enter recesses located in the center of the gear wheel 31, and upon opposite sides thereof. The solid intermediate portion of the said gear wheel 31, separating the ends of the two said shafts and maintaining the said gear wheel in its proper position. The said gear wheel 31, is provided on each side with a clutch receiving annulus 32, each of which surrounds one of the shafts 22, or 23, and is adapted to engage the clutch thereof. The gear wheel 33, meshes with the gear wheel 31. Said gear wheel 33, being journaled upon the shaft 34. A lever operated clutch 35, is splined upon said shaft 34, and is adapted to be thrown into engagement with the wheel 33, and thereby make the said wheel 33, rigid with the said shaft 34. The shaft 34, is also provided with a gear wheel 36, which engages an internally geared ring 37, (see Fig. 1,) fixed to the traction wheel 38, of the moving object.

It will thus be seen that by throwing the clutch 25, into engagement with the wheel 31, and the clutch 35, into engagement with the wheel 33, that the engine 14 may be used as a prime mover for the moving object. By throwing the clutch 25, into engagement with the wheel 31, and the clutch 24, into engagement with said wheel, the engine 14, may operate the motor and dynamo 21, as a dynamo to charge the batteries 27, or the motor and dynamo 21, using the current from the batteries and operating as a motor may operate the engine 14, (desirable in starting the engine). Or when the clutches are thrown as last above described both prime movers may be operating the moving object by throwing the clutch 35, into engagement with the wheel 33.

By throwing the clutch 24, into engagement with the wheel 31, and clutch 35, into engagement with wheel 33, the motor and dynamo 21, (used as a motor) acts as a prime mover for the moving object.

Having described my invention, what I claim as new and desire to secure by Letters Patent is:—

1. A device of the character as described consisting of a beam mounted upon a wheel, and adapted to be attached to a moving object, an engine mounted upon said beam, a motor and dynamo mounted upon said beam and having its shaft in alinement with the engine shaft, storage batteries carried by said beam, and being electrically connected with said motor and dynamo, and a means for transmitting motion from the engine, motor and dynamo, to the moving object.

2. A device of the character as described consisting of a beam mounted upon a wheel, and adapted to be attached to a moving object, an engine mounted upon said beam, a motor and dynamo mounted upon said beam and adapted to be operatively connected with said engine, storage batteries carried by said beam, and being electrically connected with said motor and dynamo, and a means for transmitting motion from the engine, motor and dynamo to the moving object.

3. A device of the character as described consisting of a beam mounted upon a wheel, and adapted to be attached to a moving object, a motor and dynamo located upon said beam, and storage batteries located along the side of the beam and electrically connected with the prime mover, and a means for transmitting motion from the prime mover to the moving object.

4. A device of the character as described consisting of an I-beam mounted upon a wheel, and adapted to be attached to a moving object, a motor and dynamo located upon said beam, and storage batteries located along each side of the I-beam and electrically connected with the prime mover, and a means for transmitting motion from the prime mover to the moving object.

5. In a device of the character as described, a means for transmitting motion from prime movers to a moving object consisting of a gear wheel receiving in its sides the ends of the shafts of the prime movers, and serving to separate said ends, said wheel adapted to be made to rotate with one or the other of the same, or both, and a means for transmitting motion from said gear to the moving object.

6. In a device of the character as described, a means for transmitting motion from prime movers to a moving object consisting of a gear wheel located between the prime movers, and serving to separate said ends and receiving in its opposite sides the alined shafts of the movers, said wheel adapted to be made to rotate with one or the other of the same, or both, and a means for transmitting motion from said gear to the moving object.

7. In a device of the character as described, a means for transmitting motion from prime movers to a moving object consisting of a gear wheel receiving in the center of its opposite sides the alined shafts of the movers, said wheel adapted to be made to rotate with one or the other of the same, or both, and a means for transmitting motion from said gear to the moving object.

8. A traction attachment for moving objects consisting of an engine and a motor and dynamo mounted with their shafts in alinement but spaced apart, a means located in said space between the shafts but not rigidly attached to either, and adapted to transmit motion from said engine and motor and dynamo to the moving object, and a means for causing the first said means to rotate with both of said shafts.

9. A traction attachment for moving objects consisting of an engine and a motor and dynamo mounted with their shafts in alinement but spaced apart, a means located in said space between the shafts but not rigidly attached to either, and adapted to transmit motion from said engine and motor and dynamo to the moving object, said means to rotate with either or both said shafts.

10. In the device of the character as described, a means for transmitting motion from a plurality of prime movers having their shafts spaced apart to a moving object consisting of a gear wheel located in the space between the shafts of the prime movers, but not rigidly attached to either, and adapted to be made to rotate with the same, and a means for transmitting motion from said gear wheel to the moving object.

11. In a device of the character as described, a means for transmitting motion from a plurality of prime movers having their shafts spaced apart, to a moving object consisting of a gear wheel located in the space between the shafts of the prime movers, but not rigidly attached to either, and adapted to be made to rotate with one or the other of the same, and a means for transmitting motion from said gear wheel to the moving object.

12. In a device of the character as described, a means for transmitting motion from a plurality of prime movers, having their shafts spaced apart to a moving object, consisting of a gear wheel located in the space between the shafts of the prime movers, but not rigidly attached to either, and adapted to be made to rotate with one or the other of the same, and a means for transmitting motion from said gear wheel to the moving object, consisting of a shaft leading to the moving object, a gear wheel journaled upon said shaft and meshing with the first said gear wheel, and a means for causing the last said gear wheel to rotate with the shaft leading to the moving object.

In testimony whereof I affix my signature, in presence of two witnesses.

GEORGE G. SCHROEDER.

Witnesses:
 F. LIEBSCHUTZ,
 EDWARD LACY.